United States Patent [19]

Lewis et al.

[11] Patent Number: 5,389,324
[45] Date of Patent: Feb. 14, 1995

[54] LAYER THICKNESS GRADIENT CONTROL IN MULTILAYER POLYMERIC BODIES

[75] Inventors: Ray A. Lewis; David M. Wisniewski; Ravi Ramanathan; Walter J. Schrenk, all of Midland, Mich.

[73] Assignee: The Dow Chemical Company, Midland, Mich.

[21] Appl. No.: 72,255

[22] Filed: Jun. 7, 1993

[51] Int. Cl.[6] .................. B29C 47/06; B29C 47/92
[52] U.S. Cl. .................... 264/171; 264/1.6; 264/1.9; 425/133.5; 425/462
[58] Field of Search ............. 264/171, 245, 1.6, 1.3, 264/1.9; 425/131.1, 133.5, 462

[56] References Cited

U.S. PATENT DOCUMENTS

| | | | |
|---|---|---|---|
| 3,444,031 | 5/1969 | Schrenk | 264/1.6 |
| 3,557,265 | 1/1971 | Chisholm et al. | |
| 3,565,985 | 2/1971 | Schrenk et al. | |
| 3,576,707 | 4/1971 | Schrenk et al. | |
| 3,687,589 | 8/1972 | Schrenk | |
| 3,711,176 | 1/1973 | Alfrey, Jr. et al. | |
| 3,759,647 | 9/1973 | Schrenk et al. | |
| 3,773,882 | 11/1973 | Schrenk | |
| 3,860,036 | 1/1975 | Newman, Jr. | |
| 3,884,606 | 5/1975 | Schrenk | |
| 4,094,947 | 6/1978 | Alfrey, Jr. et al. | 425/133.5 |
| 5,094,788 | 3/1992 | Schrenk et al. | |
| 5,094,793 | 3/1992 | Schrenk et al. | |
| 5,202,074 | 4/1993 | Schrenk et al. | 264/245 |
| 5,269,995 | 12/1993 | Ramanathan et al. | 264/171 |

FOREIGN PATENT DOCUMENTS 53-129251 11/1978 Japan .................. 264/171

OTHER PUBLICATIONS

Radford et al, "Reflectivity of Iridescent Coextruded Multilayered Plastic Films", Polymer Eng. & Sci., May 1973, vol. 13 No. 3.
Schrenk et al, "Coextruding Multilayer Blown Film-Part 1," SPE Journal, Jun. 1973, vol. 29.
Schrenk et al., "Coextruding Multilayer Blown Film-Part 2," SPE Journal, Jul. 1973-vol. 29.
Schrenk et al, "Flow Analysis of Non-Newtonian Multilayer Coextrusion", Polymer Blends, Ch. 15, 1978.

Primary Examiner—Jeffery R. Thurlow

[57] ABSTRACT

Methods and apparatus for generating, and then precisely controlling, layer thickness gradients in multilayered polymeric reflective bodies are provided. The creation of such gradients is useful in tailoring multilayer bodies to reflect and/or transmit desired wavelengths of light. Both thermal and mechanical methods, as well as combinations thereof, are used.

28 Claims, 7 Drawing Sheets

LAYER THICKNESS GRADIENT CONTROL IN MULTILAYER POLYMERIC BODIES

BACKGROUND OF THE INVENTION

This invention relates to methods and apparatus for generating controlled layer thickness gradients in multilayered polymeric bodies which are useful as optically reflective articles.

The coextrusion of multilayer sheets and other articles wherein individual layer thicknesses are on the order of microns is known in the art. For example, Schrenk et al, U.S. Pat. Nos. 3,773,882 and 3,884,606, teach devices which prepare multilayered coextruded thermoplastic polymeric materials having substantially uniform layer thicknesses. The feedblock of the coextrusion device receives streams of diverse thermoplastic polymeric materials from sources such as heat plastifying extruders. The streams of these thermoplastic materials are passed to a mechanical manipulating section within the feedblock. This section serves to rearrange the original streams into a single multilayered stream having the number of layers desired in the final body.

Optionally, this multilayered stream may be subsequently passed through a series of layer multiplying means (sometimes termed interfacial surface generators) in order to increase further the number of layers in the final body as is described in Schrenk et al, U.S. Pat. Nos. 3,759,647, 5,094,793, and 5,094,788. The multilayered stream is then passed into an extrusion die which is so constructed and arranged that streamlined flow is maintained therein. Such an extrusion die is described in Chisholm et al, U.S. Pat. No. 3,557,265. The resultant product is extruded through the die to form a multilayered body in which each layer is generally parallel to the major surface of adjacent layers. This technology has been called microlayer coextrusion technology because of the thinness of the layers which are formed. Microlayer coextrusion is to be distinguished from conventional multilayer coextrusion which typically involves the production of less than about fifteen layers, each having thicknesses which may be from one to two orders of magnitude greater than the layer thicknesses produced in microlayer coextrusion.

Such multilayer polymeric bodies have found use as optically reflective sheets and films. For example, Alfrey, Jr. et al, U.S. Pat. No. 3,711,176, and Radford et al, "Reflectivity of Iridescent Coextruded Multilayered Plastic Films", Polymer and Engineering Science, Vol. 13, No. 3, pp. 216–221 (May 1973), teach a multilayered highly reflective thermoplastic body fabricated using the multilayer coextrusion devices of Schrenk, discussed above. The reflective optically thin film layers of Alfrey, Jr. et al and Radford et al relied on the constructive interference of light to produce reflected visible, ultraviolet, and/or infrared portions of the electromagnetic spectrum. Further, as such optically thin films are highly reflective at wavelengths where there is constructive interference, the multilayer films were made up of only a few hundred layers or less.

Other multilayer polymeric bodies also use constructive interference of light to produce useful reflective articles. For example, commonly-assigned Schrenk et al, U.S. patent application Ser. No. 07/969,710, filed Oct. 29, 1992, and entitled "Formable Reflective Multilayer Body", teach broad bandwidth reflective films which utilize layer thickness gradients. Commonly-assigned Wheatley et al, U.S. patent application Ser. No. 07/963,305, filed Oct. 16, 1992, and entitled "All-Polymeric Cold Mirror" teach a multilayer body which reflects visible wavelengths while transmitting a substantial portion of infrared wavelengths.

For such multilayer films which use constructive interference, the location of the first order reflectance peak for a typical two component film is defined by the equation:

$$\gamma_I = 2(N_1 d_1 + N_2 d_2) \qquad \text{(Equation 1)}$$

where, $\gamma_I$ is the wavelength of first order reflection in nanometers, $N_1$ and $N_2$ are the refractive indices of the first and second polymers, and $d_1$ and $d_2$ are the respective layer thicknesses of those polymers in nanometers. As can be seen, a controlled distribution of the layer thicknesses, d, will spread the first order reflectance peak over a desired wavelength range. The shorter reflected wavelengths correspond to thinner layers in the body while longer reflected wavelengths correspond to thicker layers. If the layer thicknesses can be controlled precisely, reflective films having desired reflective and transmissive characteristics could be produced.

Several of the patents and applications discussed above contain teachings with respect to introducing layer thickness gradients into multilayer polymeric bodies. For example, Alfrey et al describe multilayer reflective films having layer thickness gradients. The methods suggested for creating the gradients include embossing of the film, selective cooling of the film during final stretching, and using a rotating die to create the layers (with reference to U.S. Pat. Nos. 3,195,865; 3,182,965; and 3,051,452). The Schrenk et al '985 and '707 patents also mention embossing and differential cooling.

However, the techniques of embossing and selective cooling relate to attempts to introduce layer thickness gradients into an already extruded film. Such techniques do not permit precise generation or control of the gradients. The use of a rotating die produces layer thickness gradients as a natural consequence of using the rotating die, with thinner layers being located nearest the rotating die boundaries. Again, however, the gradients produced cannot be precisely controlled.

Other methods have been used in the past which have introduced layer thickness gradients into a multilayer polymeric article. For example, Schrenk et al, U.S. Pat. No. 3,687,589, teaches the use to rotating or reciprocating shear producing means to vary the volume of material entering the feed slots in a coextrusion feedblock where the polymer streams are subdivided. However, precise control of volumetric flow rates using such devices is difficult to achieve. More recently, Schrenk et al, U.S. Pat. No. 5,094,788, teach using variable vanes in an interfacial surface generator downstream from a coextrusion die to introduce a layer thickness gradient into a multilayer polymer melt stream.

However, needs still exist in the art for methods and apparatus for generating precisely controlled layer thickness gradients in multilayered polymeric bodies which are useful as optically reflective articles.

SUMMARY OF THE INVENTION

The present invention meets those needs by providing methods and apparatus for generating, and then precisely controlling, layer thickness gradients in multilayered polymeric reflective bodies. The present invention is useful in tailoring multilayer bodies to reflect and/or transmit desired wavelengths of light.

In accordance with one aspect of the present invention, a method for generating a layer thickness gradient within a multilayer polymeric body is provided and includes the step of providing separate streams of at least first and second heat plastified polymeric materials. Typically, the polymers will be heated and plastified in an extruder. The polymer streams from the extruders are then divided into a plurality of first substreams and a plurality of second substreams, respectively.

To form the gradient in layer thicknesses, the respective flow rates of the polymeric materials in the substreams are controlled to provide a differential in the volume of polymeric materials flowing through each of the substreams. The substreams are then combined, preferably in a feedblock or other device, into a composite stream having the plurality of first and second substreams interdigitated into overlapping generally planar layers with substantially parallel layer interfaces. Preferably, the composite stream is then passed through a forming die while maintaining streamlined flow of the planar layers to form the multilayer body. Optionally, a third stream of heat plastified thermoplastic material may be provided to the exterior surfaces of the composite stream to form skin layers, and the composite stream and skin layers then formed into the multilayer polymeric body. Because of the differential in the volume of polymeric materials flowing in the substreams making up the composite stream, the individual layers in the body will have a gradient in thicknesses.

The flow rate of the polymeric materials in the respective substreams is controlled in one of two preferred manners. In a first embodiment, the temperature of at least some of the plurality of first and second substreams may be controlled to provide a temperature differential among at least some of the substreams, causing changes in the viscosities of the polymeric materials in the substreams and thereby controlling their flow. This is preferably accomplished by grouping the plurality of first and second substreams into at least two zones and separately controlling the temperature of each zone. Preferably, the temperature differential maintained between zones is at least about 5° F.

In a second embodiment, the flow rate of at least some of the polymeric materials in the plurality of first and second substreams is controlled by modifying the geometry of the passages or feed slots through which the plastified polymeric materials flow in the feedblock. Thus, the path lengths, widths, or heights of the plurality of first and second substreams may be modified to control the flow rate of the polymer streams.

For example, assuming Newtonian flow of the heat plastified polymer streams, the flow rate of a fluid stream through a regular rectangular passage or channel is inversely proportional to the length of the passage or channel. Thus, the path lengths may be linearly varied, varied in a step-wise fashion, or varied in any other regular manner to create desired gradients in layer thicknesses in the multilayer body. In a preferred embodiment, the flow rate in all of the plurality of first and second substreams is simultaneously controlled.

Alternatively, again assuming Newtonian flow, the flow of the polymers in the substreams is directly proportional to path width and has a cubic dependence on path height. Again, by modifying the geometry of the flow passages or channels in these manners, the rate of flow, and thus the thickness of the layers formed, in each of the substreams can be controlled.

In yet another embodiment of the invention, layer thickness gradients may be introduced into the multilayer composite stream by mechanical manipulation of some or all of the layers in the composite layered stream leaving the feedblock. Thus, a method for generating a layer thickness gradient within a multilayer polymeric body is provided which includes the steps of providing separate streams of at least first and second heat plastified polymeric materials and then dividing each of the streams into a plurality of first substreams and a plurality of second substreams, respectively. The plurality of first and second substreams are then combined, preferably in a feedblock or other device, into a first composite stream having the first and second substreams interdigitated into overlapping generally planar layers having substantially parallel layer interfaces. The composite stream may then be separated along either an axis perpendicular or parallel to the planar layers into a plurality of branch streams. At least one of the branch streams is then mechanically manipulated to increase the number of layers in the branch stream. Then, the branch streams are recombined into a second composite stream having overlapping generally planar layers and also having an increased number of substantially parallel layer interfaces to form the multilayer body. Preferably, the second composite stream is then passed through a forming die while maintaining streamlined flow of the planar layers to form the multilayer body.

Optionally, a third stream of heat plastified thermoplastic material may be provided to the exterior surfaces of the second composite stream to form protective skin layers, and the composite stream and skin layers then formed into the multilayer polymeric body. The layers which have been mechanically manipulated to increase their number will be correspondingly thinner than the layers which were not manipulated, thus producing the gradient in layer thicknesses.

Layer thickness gradients may also be formed using a combination of the above-described methods. For example, a combination of temperature control in the coextrusion feedblock and layer manipulation downstream from the coextrusion feedblock may be used to introduce layer thickness gradients into the multilayer stream. Alternatively, the path lengths of the substreams may be varied in the coextrusion feedback to introduce a layer thickness gradient, and a further gradient may be produced using a variable vane interfacial surface generator as taught in Schrenk et al, U.S. Pat. No. 5,094,788. The effects of imposing a layer thickness gradient at the coextrusion feedblock may be multiplied downstream by layer manipulation in an interfacial surface generator or generators.

The present invention also provides an apparatus for generating a layer thickness gradient within a multilayer polymeric body. The apparatus comprises means for providing at least first and second streams of heat plastified polymeric materials and means for dividing the at least first and second streams into a plurality of first substreams and a plurality of second substreams, respectively. The respective flow rates of the polymeric materials in the plurality of first and second substreams are controlled by means which provide a differential in the volume of polymeric materials flowing through each of the substreams.

Means for combining the substreams such as, for example, a feedblock is provided. The combined substreams form a composite stream having the plurality of first and second substreams interdigitated into overlapping generally planar layers with substantially parallel layer interfaces to form the multilayer body. Again, by controlling the flow rates of the respective polymeric substreams, layers in the body having a gradient in thicknesses are produced.

In one embodiment, the means for controlling the flow rate of the polymeric materials comprise means for heating at least some of the plurality of first and second substreams to provide a temperature differential among at least some of the substreams. Such means may comprise one or more heaters which are positioned to selectively heat at least some of the substreams. The substreams may be grouped into separate heating zones as desired to provided the necessary temperature differential. Any suitable type of heater may be used.

In another embodiment, the means for controlling the flow rate of the polymeric materials comprise a feedblock containing flow passages for each of the plurality of first and second substreams, with the flow passages having varying geometries as measured from the points at which the plurality of substreams enter the passages until the substreams are discharged from the passages. Such varying geometries may be produced by varying either the lengths, widths, or heights of the flow passages. In a preferred embodiment, the lengths of the flow passages may be varied linearly, in a step-wise fashion, or in any other regular manner to produce the desired layer thickness gradients.

In still another embodiment of the invention, the layer thickness gradients in the multilayer body may be introduced by mechanically manipulating at least some of the layers in the body so that those layers will be of a different thickness than other layers in the body. This layer manipulation is preferably accomplished using an apparatus which includes means for providing at least first and second streams of heat plastified polymeric materials and means for dividing the at least first and second streams into a plurality of first substreams and a plurality of second substreams, respectively. The substreams are combined by a combining means such as, for example, a feedblock into a composite stream having the plurality of first and second substreams interdigitated into overlapping generally planar layers with substantially parallel layer interfaces to form the multilayer body.

The composite stream is then separated into a plurality of branch streams. Means for manipulating at least one of the branch streams is provided to increase the number of layers in the branch streams. The branch streams are then recombined into a second composite stream having overlapping generally planar layers and also having an increased number of substantially parallel layer interfaces to form the body, with the layers having a gradient in thicknesses. Preferably, the means for separating the composite stream into branch streams comprise vanes which separate the composite stream along an axis either perpendicular or parallel to the planar layers.

The methods and apparatus of the present invention may be used to form reflective multilayer polymeric bodies for a number of uses. For example, layer thickness gradients may be introduced into reflective films to produce films having broad bandwidth reflecting characteristics across substantially the entire visible spectrum. Layer thickness gradients may also be introduced to control the wavelengths at which incident light is reflected. For example, an all-polymeric cold mirror may be formed from a film having layer thicknesses which cause incident visible light to be reflected while incident infrared light is transmitted. Other films may be produced which transmit visible wavelengths yet reflect in the infrared region of the spectrum.

Accordingly, it is a feature of the present invention to provide methods and apparatus for generating and then precisely controlling layer thickness gradients in multilayered polymeric reflective bodies to tailor such multilayer bodies to reflect and/or transmit desired wavelengths of light. This, and other features and advantages of the present invention will become apparent from the following detailed description, the accompanying drawings, and the appended claims.

DETAILED DESCRIPTION OF THE PREFERRED EMBODIMENTS

Figure 1:
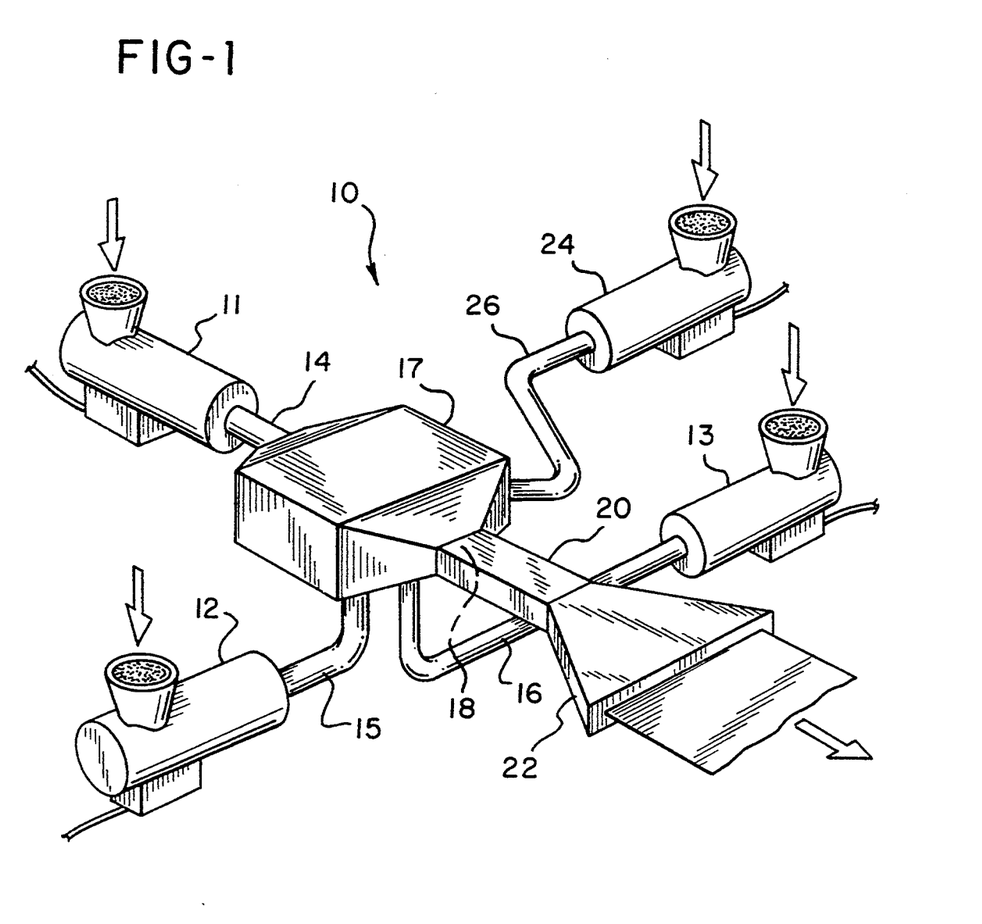
FIG. 1 is a schematic representation of an apparatus for preparing a multilayered polymeric body.

A typical multilayer coextrusion apparatus is illustrated in FIG. 1. As shown, extrusion apparatus 10 includes, in cooperative combination, first, second, and optional third sources of heat plastified polymeric resins for extruders 11, 12, and 13, respectively. For descriptive purposes, the different polymer streams from extruders 11, 12, and 13 will be referred to herein as polymer streams A, B, and C. The optional third source of polymer resin may be used when it is desired to produce a body having different layer repeating unit patterns such as ABCABC or ABCBABCB. The third polymer may differ in refractive index from the first and second polymers. In one embodiment, the third polymer may comprise a copolymer of the first and second components. Suitable polymeric resins may be selected from among those disclosed in commonly-assigned Wheatley et al, U.S. Pat. No. 5,122,905.

Extruders 11, 12, and (optionally) 13 discharge the heat plastified polymeric resins into conduits 14, 15, and 16, respectively. A coextrusion feedblock 17 is in operative combination with conduits 14, 15, and 16 and receives first, second, and optional third heat plastified streams therefrom. Feedblock 17 combines and arranges the heat plastified polymers into interdigitated, layered relationships as taught in the aforementioned U.S. Pat. Nos. 3,773,882 and 3,884,606. Feedblock 17 further defines an extrusion orifice 18 from which issues a first composite stream of polymeric material having alternating substantially planar layers of first and second (and optionally third) polymeric materials.

From orifice 18, the composite stream passes through a mechanical manipulating section 20 (interfacial surface generator) which serves to rearrange the alternating layers into a second composite stream having more than the original number of layers as explained in greater detail below. Additional manipulating sections may be arranged in series to multiply further the number of layers in the stream. The number of additional layers created is determined by the initial number of layers times the number of channels in the interfacial surface generator or generators.

The multilayered stream is then passed into a shaping die 22 which is so constructed and arranged that streamlined flow is maintained therein. Such an extrusion die is described in U.S. Pat. No. 3,557,265, the disclosure of which is incorporated by reference herein. While a sheet or film forming die 22 is illustrated, it will be appreciated by those skilled in the art that a forming die of any desired configuration may be used to extrude not only films and sheets, but also other profiles and shapes. The configuration of the shaping die can vary and can be such as to reduce the thickness of each of the layers. The precise degree of reduction in thickness of the layers delivered from the mechanical manipulating section, the configuration of the die, and the amount of mechanical working of the body after extrusion are all factors which affect the thickness of the individual layers in the final body.

Also shown schematically in FIG. 1 is an additional extruder 24 which acts as a source of protective boundary layer material. Extruder 24 discharges heat plastified polymer into conduit 26 which is in operative communication with feedblock 17 immediately upstream from mechanical manipulating section 20. As explained and illustrated in greater detail in commonly-assigned, U.S. Pat. No. 5,269,995 entitled "Coextrusion of Multilayer Articles using Protective Boundary Layers and Apparatus Therefor", the protective boundary layers serve to prevent layer breakup adjacent to the walls of the feedblock 17, within the interfacial surface generator or generators 20, and/or extrusion die 22.

Figures 2, 2A:
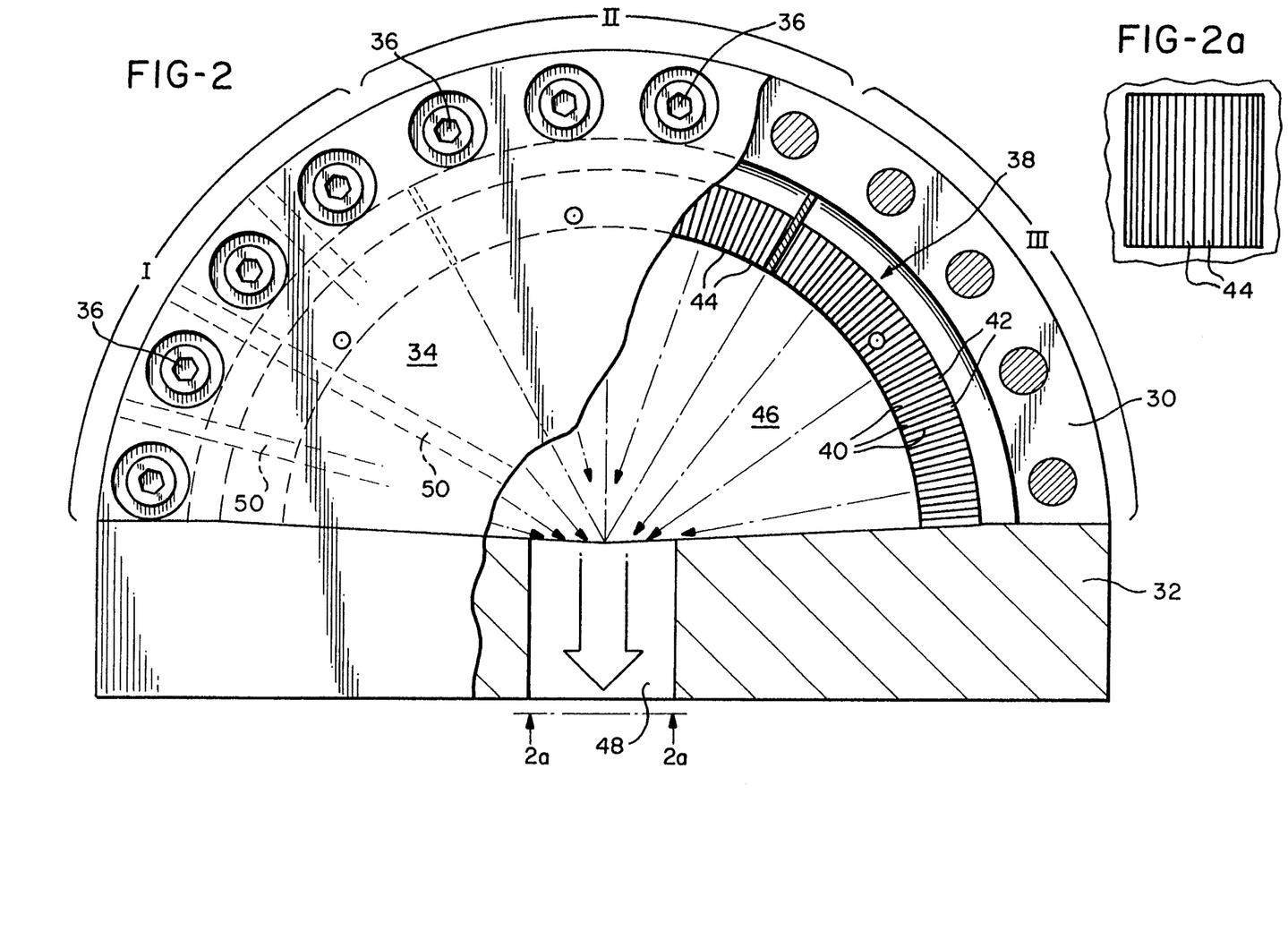
FIG. 2 is a schematic, partially cut-away view of a coextrusion feedblock having zones of controlled temperature.
FIG. 2a is a cross-sectional view taken along line 2a—2a in FIG. 2 showing the gradient in layer thicknesses of polymeric materials exiting the coextrusion feedblock.

FIG. 2 illustrates coextrusion feedblock 17 in greater detail. While feedblock 17 is illustrated as semicircular in design and operation, it will be appreciated that other feedblock designs may be utilized. The construction and operation of feedblock 17 as shown is similar to the devices described in commonly-assigned Schrenk, U.S. Pat. Nos. 3,773,882 and 3,884,606, the disclosures of which are incorporated by reference. Feedblock 17 includes a housing 30 mounted on base plate 32. A top plate 34, which is secured to housing 30 by bolts 36, is shown partially cut away to expose feed ring 38. Feed ring 38 includes a plurality of generally rectangular-shaped slots or feed passages 40 through which the heat-plastified polymer streams from extruders 11, 12, and (optionally) 13 flow. Slots 40 include inlet ends 42 and outlet ends 44. Plenums or manifolds (not shown) convey the individual polymer melt streams, A, B, and C, to selected inlets 42 to provide the desired layer arrangement such as, for example, ABCABC or ABCBABCB. Outlets 44 communicate with an inner plenum 46 having a generally semicircular configuration as shown.

The polymer substreams flowing out of outlets 44 join in plenum 46 to form a generally parallel, multilayered composite stream with the individual polymer streams interdigitated and having substantially planar interfaces. Streamlined flow is maintained as the polymers flow in the direction shown by the arrows through die 48.

As shown in FIG. 2, feed passages 40 have identical lengths, widths, and heights. If thermoplastic polymers having matched viscosities have been chosen, the resulting flow rates for each substream layer will be substantially the same. To change the layer thickness gradient across the layers in accordance with the present invention, a thermal gradient is introduced into housing 30. In the embodiment shown in FIG. 2, the feedblock 17 may be divided into three temperature-controlled zones, labelled I, II, and III. It will be appreciated by those skilled in the art that the illustration of three temperature-controlled zones is for purposes of illustration only and that any number of temperature-controlled zones may be imposed on the feedblock.

The temperature in each zone is controlled by the use of electrical cartridge heaters 50 which are inserted into holes bored into housing 30. Only a few of the heaters 50 are shown for ease of explanation and illustration. Such cartridge heaters are commercially available from the Watlow Company. The number of cartridge heaters and their wattage in each zone should be sufficient to effect temperature control within each zone to within 5° F. Thermocouples (not shown) are also present in each zone to measure the temperature in the zone and to control the operation of the cartridge heaters, and thus the temperature, in each zone. It will be apparent to those skilled in the art that other heating devices may be used to control the temperature in each zone.

As shown in FIG. 2a, a layer thickness gradient results when there is a temperature gradient maintained between the temperature-controlled zones. FIG. 2a illustrates an embodiment in which the temperature of zone II in the center of the feed ring 38 is heated to a temperature higher than that of zones I and III. Because the viscosity of the polymers in zone II decreases with increasing temperature, a greater volume of polymeric material flows through zone II in the same unit of time than flows through zones I and III. This results in the layers near the center of the composite stream being thicker than those at the edges.

Figure 3A:
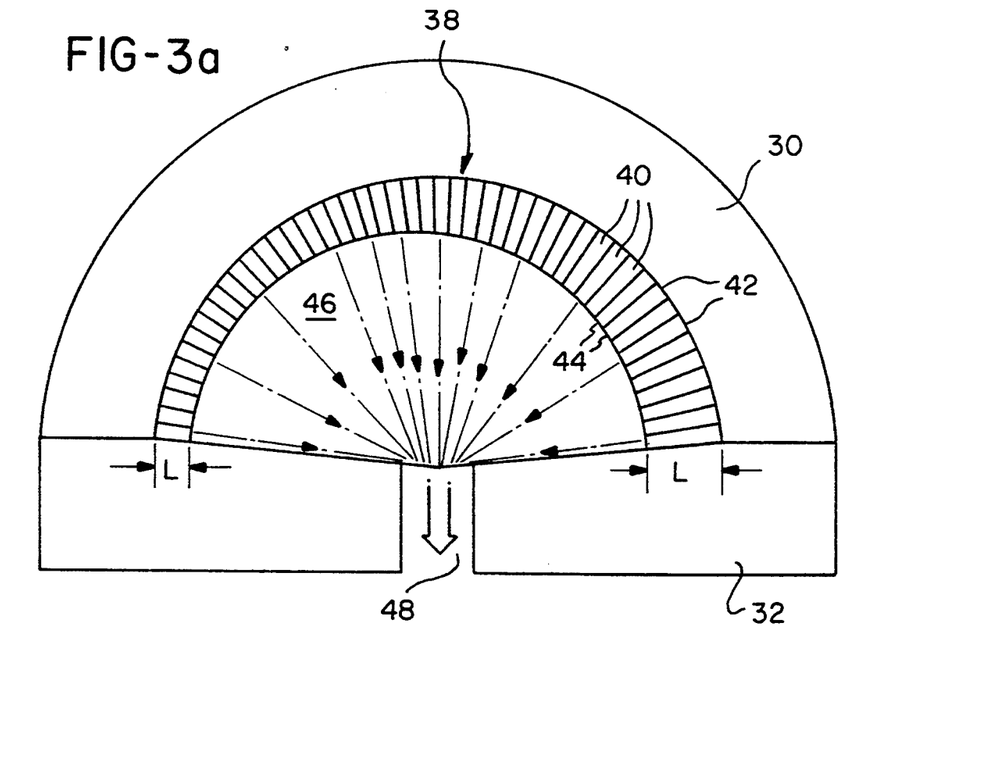
FIGS. 3a and 3b are schematic, partially cut-away top views of coextrusion feedblocks having linearly varying land length feed ports and step-wise varying land length feed ports, respectively.

In FIG. 3a, where like reference numerals refer to like elements, another embodiment of the invention which provides a layer thickness gradient within the multilayer polymeric body is shown. In this embodiment, the layer thickness gradient is imposed by altering the geometry of the flow passages or slots 40 in coextrusion feedblock 17. As shown, the land length, L, of passages 40 varies linearly around feed ring 38 from shortest to longest (clockwise direction). As the flow rate of the polymer streams is inversely proportional to the length of passages 40, a greater volume of polymer will flow through the shorter land length passages, resulting in a thickness gradient among the layers from thickest to thinnest (clockwise direction) exiting into plenum 46.

Figure 3B:
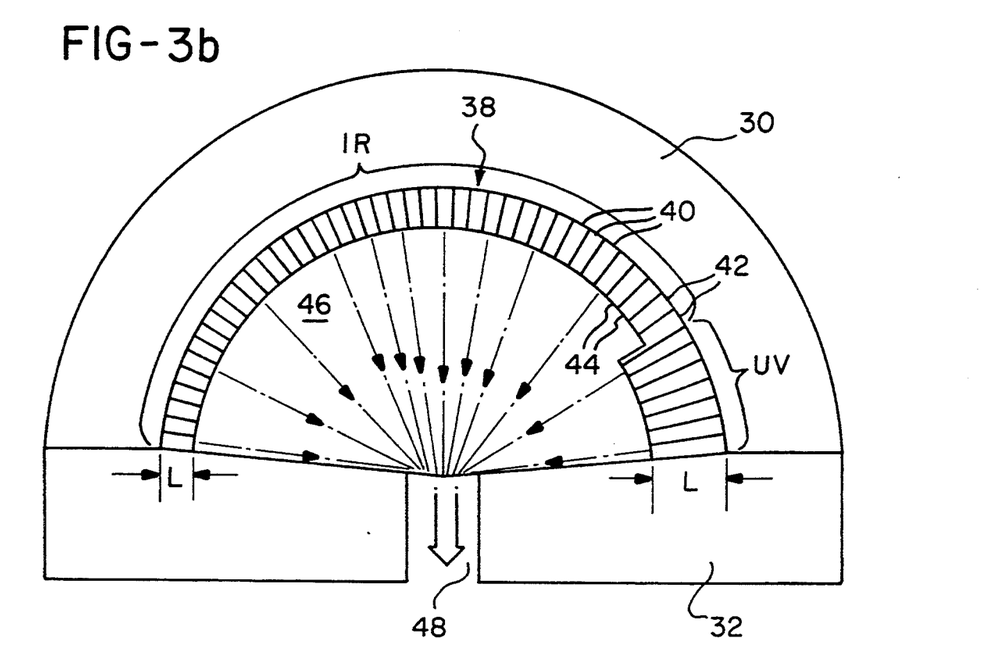

FIG. 3b illustrates another variation on the embodiment of FIG. 3a. In FIG. 3b, the land length, L, of feed stream passages 40 is varied in a step-wise fashion to create a layer thickness gradient in the multilayer body. As shown, the land lengths on the passages labeled IR are shorter than those labeled UV. Thus, the stepped-gradient design of FIG. 3b could be used, for example, to produce a multilayer film or sheet which reflects at both infrared and ultraviolet wavelengths due to the different layer thicknesses produced by the step-wise change in lengths of the feed passages 40.

Figure 4:
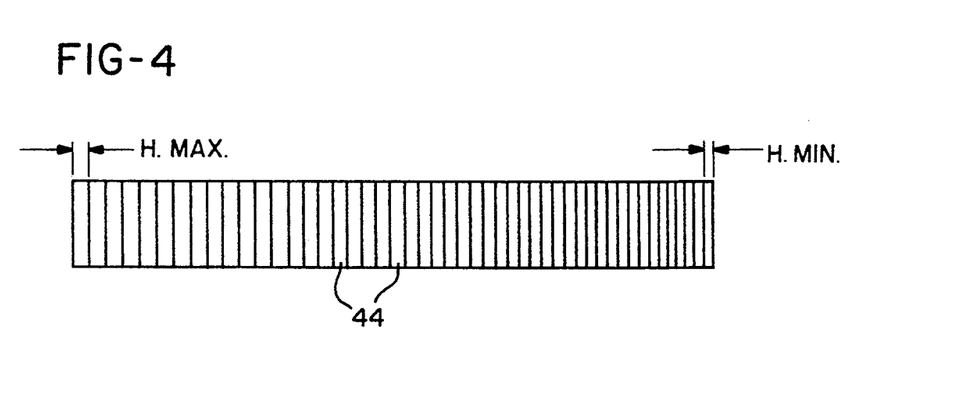
FIG. 4 is a schematic front view, shown in a flattened rather than semi-circular configuration, of a coextrusion feedblock having feed ports which vary in height.
Figure 5:
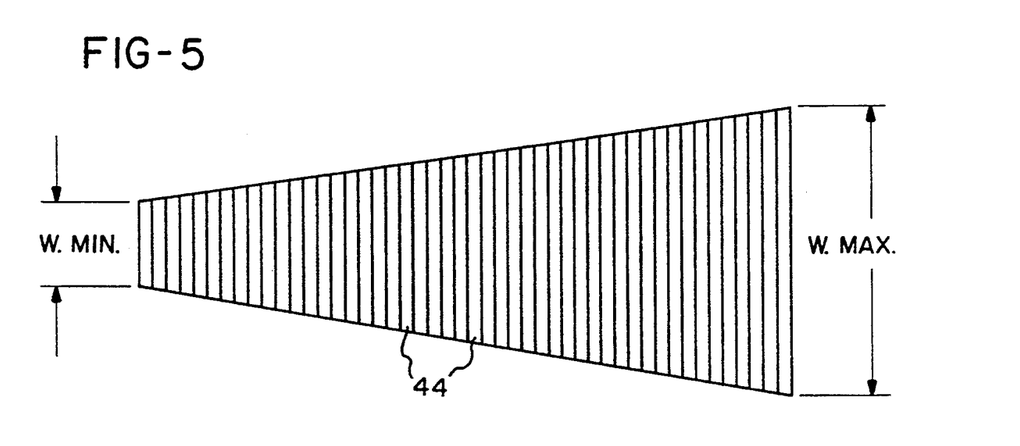
FIG. 5 is a schematic front view, shown in a flattened rather than semi-circular configuration, of a coextrusion feedblock having feed Doris which vary in width.

FIGS. 4 and 5 illustrate further variations on feed slot geometry to form layer thickness gradients within the composite, layered polymer melt stream. FIGS. 4 and 5 are drawn using views which are looking into the outlets of flow passages 40 from plenum 46, with feed ring 38 appearing to be flattened, not in its semicircular configuration. As shown in FIG. 4, the height, H, of feed passages 40 is varied in a linear fashion from left ($H_{max}$) to right ($H_{min}$) across the feed ring. While depicted as varying in a linear fashion, the height of feed passages 40 may be varied in any desired fashion. As the flow of a polymer melt stream through a generally rectangular feed passage has a cubic dependence upon path height, a layer thickness gradient will be formed by the passage of the polymer streams through the feed ring depicted in FIG. 4.

Likewise, as shown in FIG. 5, the width of the feed passages varies in a linear fashion from left ($W_{min}$) to right ($W_{max}$) across the feed ring. Again, however, the width may be varied in any desired fashion. As polymer flow is directly proportional to flow path width, a layer thickness gradient will be formed by the flowing polymer streams through the feed ring of FIG. 5. By varying the feed passage geometry as discussed above, simultaneous and substantially identical control is exerted on the polymer streams flowing through each passage. Such control is simple, precise, and more economical than attempting to exert control over each individual stream, such as by attempting to adjust volumetric flow in each stream by a series of pumps or valving arrangements.

The use of temperature alone, control of feed passage geometry alone, or a combination of the two techniques, will introduce controllable layer thickness gradients in the multilayer polymer stream as the individual polymer melt streams are formed and combined into a composite stream in the feed ring. Layer thickness gradients may also be imposed on the layers in the composite stream after the individual melt streams have been combined downstream from the feed ring.

Figure 6:
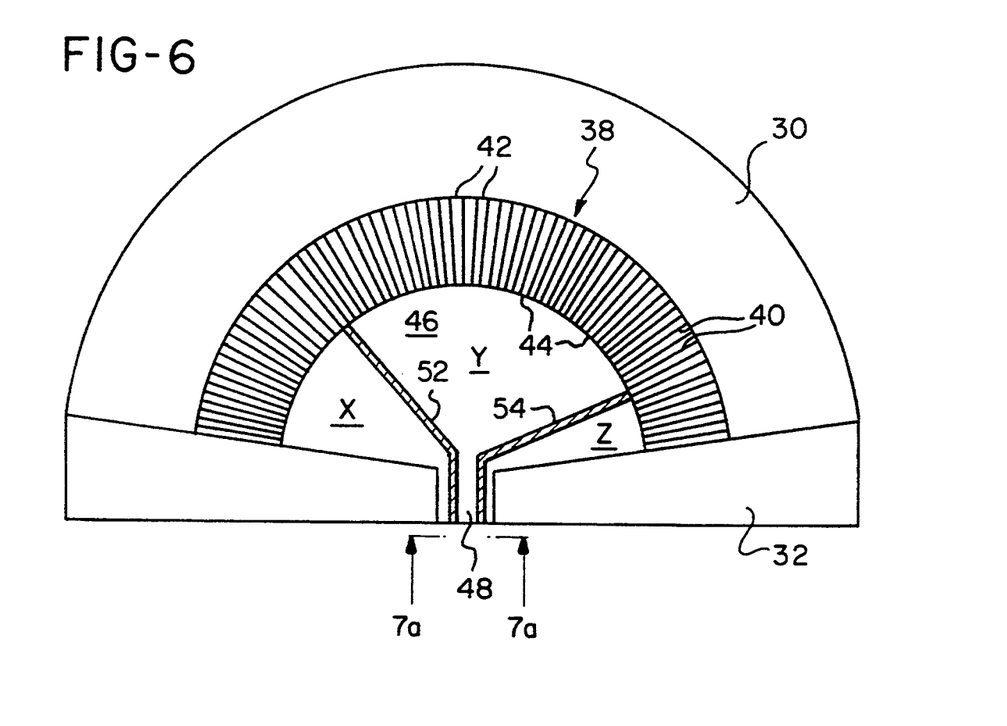
FIG. 6 is a schematic, partially cut-away view of a coextrusion feedblock showing separating vanes which divide the polymer streams parallel to the layer interfaces.
Figure 7A:
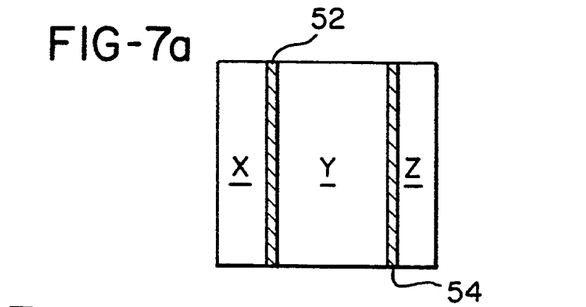
FIG. 7a is a cross-sectional view taken along line 7a—7a in FIG. 7.

As shown in FIG. 6, one preferred method for forming such layer thickness gradients is to divide or partition the composite layered stream. A number of separating vanes, such as vanes 52 and 54, may be positioned in plenum 46 of feed ring 38 to divide the layered stream into substreams X, Y, and Z. It will be appreciated that the number of vanes and their positioning in plenum 46 may be varied as desired. In the embodiment shown in FIGS. 6 and 7a, there are two vanes dividing the layered polymer stream into three portions. As shown in FIG. 7a, vanes 52 and 54 are positioned to divide the streams parallel to their layer interfaces. Each substream has a different number of layers because of the positioning of vanes 52 and 54. Alternatively, vanes 52 and 54 may be positioned down stream from a feedblock, such as feedblock 17, to divide the composite stream parallel to the layer interfaces.

Downstream from feed ring 38, one or more of these substreams X, Y, and/or Z, may be sent to a mechanical manipulating section such as an interfacial surface generator as described in Schrenk et al, U.S. Pat. Nos. 5,094,788 and 5,094,793, the disclosures of which are hereby incorporated by reference. After manipulation and layer multiplication, when those layered substreams are recombined with each other prior to forming or shaping die 22 (FIG. 1), there will be a layer thickness gradient between the manipulated and multiplied layers versus layers which were not manipulated. Alternatively, one or more of the substreams may be subjected to a different amount or degree of layer manipulation and multiplication.

Figure 7B:
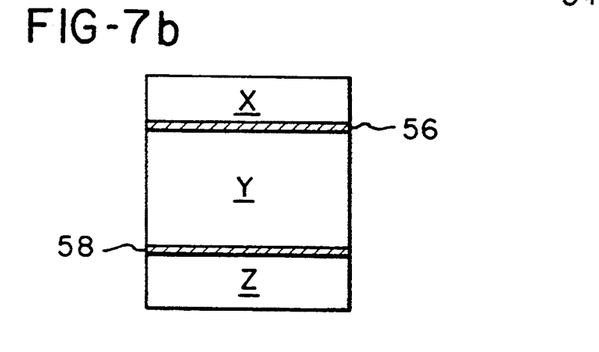
FIG. 7b is a cross-sectional view of an alternative arrangement where separating vanes have been installed downstream of the feedblock perpendicular to the layer interfaces.

FIG. 7b illustrates and alternative method of dividing the composite multilayered stream leaving feedblock 48. FIG. 7b shows horizontally-oriented vanes 56 and 58 which are positioned downstream from a feedblock, such as feedblock 17 shown in FIG. 2. Vanes 56 and 58 divide the composite stream perpendicular to the layer interfaces to form substreams which may be mechanically manipulated in one or more interfacial surface generators to multiply the total number of layers in the substream or substreams.

Again, a layer thickness gradient will be introduced when the substreams are recombined prior to the shaping die as some layers will have been thinned by layer manipulation and multiplication. Further, by imposing a thermal gradient on one or more of the substreams as they are manipulated, further layer thickness gradients may be created within each substream. Such a thermal gradient may be imposed by controlled heating and/or cooling of individual branch streams in the interfacial surface generators.

Figures 8, 8A:
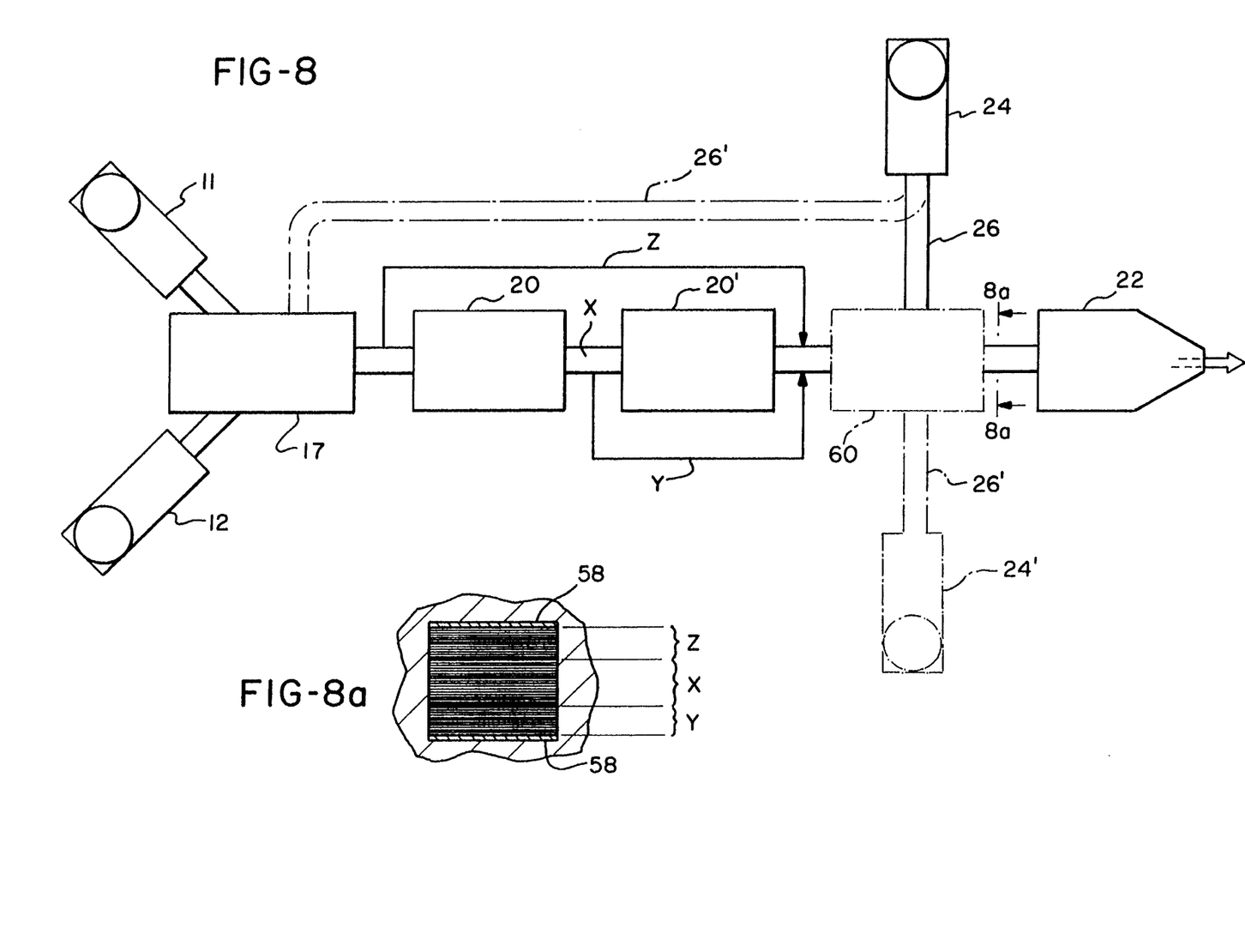
FIG. 8 is a schematic representation of an apparatus for manipulating at least some of the layers down stream from the coextrusion feedblock, also illustrating an optional skin layer extruder.
FIG. 8a is a cross-sectional view of the layers taken along line 8a—8a in FIG. 8.

FIG. 8 illustrates schematically one example of how the layered streams may be manipulated mechanically to introduce a layer thickness gradient into the multilayer bodies. For purposes of illustration only, it will be assumed that the polymer melt streams are initially divided into 657 layers and that each interfacial surface generator will double the number of layers which pass through it. As shown, and where like elements are represented by like reference numerals, heat plastified polymeric resins are provided from extruders 11 and 12 to coextrusion feedblock 17. In feedblock 17, the polymer melt streams are arranged into 657 alternating layers.

As the multilayered composite stream leaves feedblock 17 toward first interfacial surface generator 20, a portion of the stream, labeled Z, is separated and bypasses the interfacial surface generators. The remainder of the main stream, labeled X, enters interfacial surface generator 20 where the layers are divided and doubled, yielding a 1313 layer stream. After exiting first interfacial surface generator 20, another portion of the main stream, labeled Y, is separated and bypasses second interfacial surface generator 20'. The remainder of the main stream, X, enters second interfacial surface generator 20' where the layers are again divided and doubled, yielding a 2625 layer stream.

Streams X, Y, and Z are then recombined prior to entering shaping die 22 where the multilayered stream is formed into a sheet, film, or other profile. Protective skin layers 58 are added to the multilayered stream in skin layer block 60 by extruder 24 through conduit 26. Optionally, a second skin extruder 24' using conduit 26' may be used. Also, skin layers may be added initially to the polymer stream in feedblock 17 using conduit 26'.

As shown in FIG. 8a, the multilayered stream which results includes a portion Z with 657 layers, a portion X with 2625 layers, and a portion Y with 1313 layers. A layer thickness gradient is thus produced due to the differing number of layers in each portion of the stream and their differing thicknesses caused by the mechanical manipulation of those layers. Thus, layer distribution in the multilayer body is altered from a primary composite stream formed by the feedblock by subdividing portions of the primary composite stream into additional substreams. These substreams are manipulated individually to create a new combined composite stream with stacked substreams each having a controlled number of layers, layer thicknesses, and/or gradients of thickness.

The methods and apparatus of the present invention may be used to form reflective multilayer polymeric bodies for a number of uses. For example, layer thickness gradients may be introduced into reflective films to produce films having broad bandwidth reflecting characteristics across substantially the entire visible spectrum. Layer thickness gradients may also be introduced to control the wavelengths at which incident light is reflected. For example, an all-polymeric cold mirror may be formed from a film having layer thicknesses which cause incident visible light to be reflected while incident infrared light is transmitted. Other films may be produced which transmit visible wavelengths yet reflect in the infrared region of the spectrum.

In order that the invention may be more readily understood, reference is made to the following examples, which are intended to be illustrative of the invention, but are not intended to be limiting in scope.

EXAMPLE 1

A microlayer feedblock of a design as illustrated in FIG. 2 was divided into three temperatures-controlled zones (I, II, and III, as shown in FIG. 2). The three feedblock temperature-controlled zones were set at the conditions shown in Table 1 below.

TABLE 1

| Sample No. | Zone #1 | Zone #2 | Zone #3 |
|---|---|---|---|
| 49A | 500° F. | 500° F. | 500° F. |
| 49B | 500° F. | 480° F. | 500° F. |
| 49C | 460° F. | 500° F. | 540° F. |

Figure 9A:
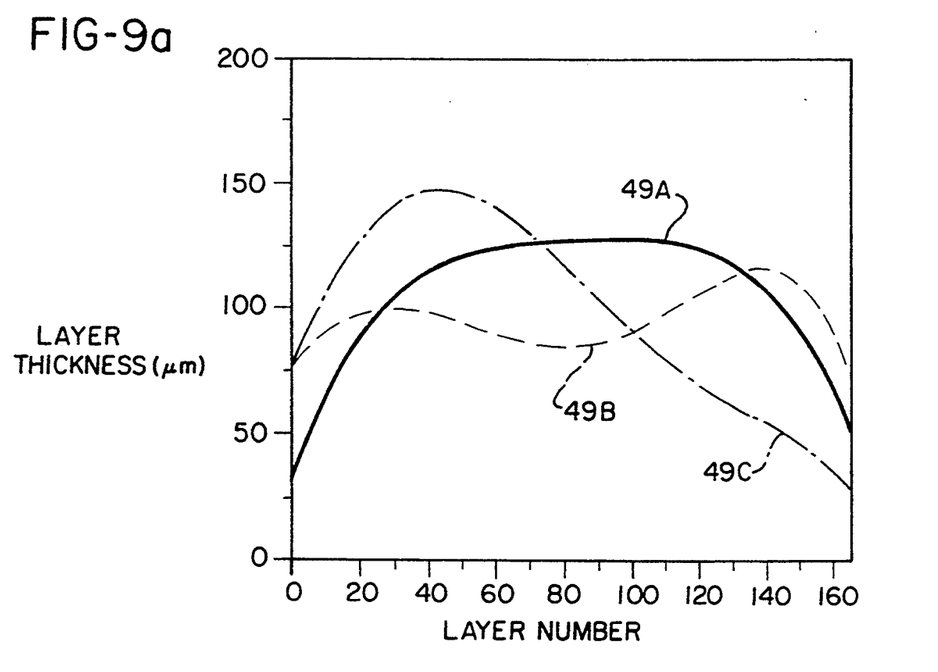
FIG. 9a is a graph of the effect of a temperature gradient on layer thickness versus layer number measured through the center of a coextruded multilayer log.
Figure 9B:
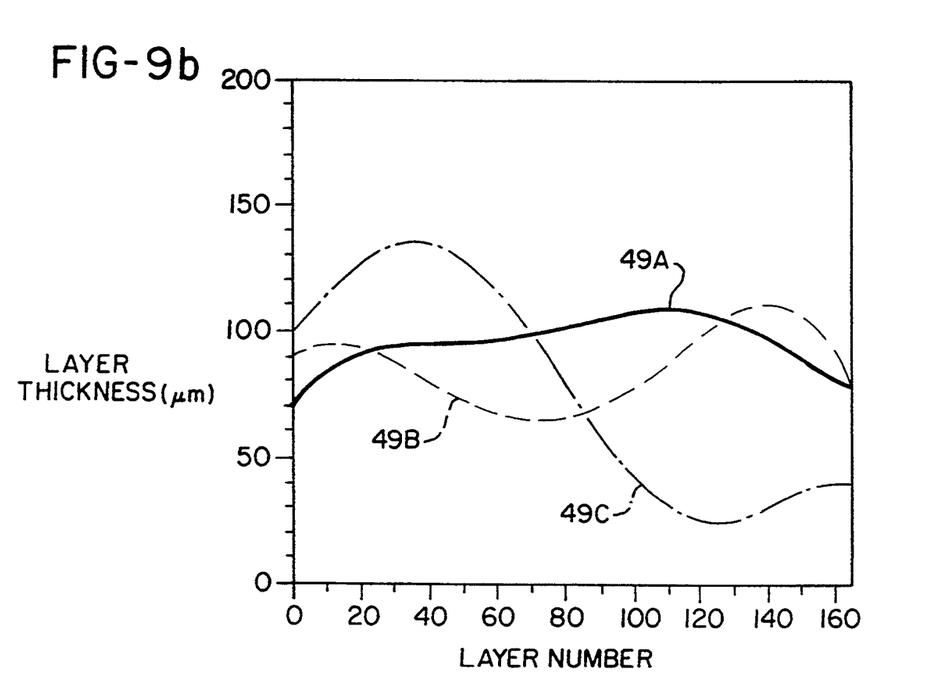
FIG. 9b is a graph of the effect of a temperature gradient on layer thickness versus layer number measured along an edge of a coextruded multilayer log.

A 165 alternating layered structure of polycarbonate and polymethyl methacrylate in the form of generally rectangular-shaped log was obtained by coextrusion through the feedblock. The individual layer thicknesses in each sample were measured microscopically by viewing a cross-section of the log and plotted as a function of position in the microlayer log in FIGS. 9a (measured at center of log) and 9b (measured at edge of log).

The graph of sample 49A is a typical layer thickness distribution for an isothermal condition. By reducing the Zone #2 temperature (sample 49B), less polymer was forced through the feed passages in the center of the feed ring, causing the middle thicknesses in sample 49B to decrease as shown. In the same way, a linear temperature gradient such as the one imposed on sample 49C produces an essentially linear layer thickness gradient.

As can be seen, the example demonstrates that the imposition of temperature gradients on a feedblock can provide a layer thickness gradient of at least 2:1 (ratio of maximum layer thickness to minimum layer thickness). Such a gradient is sufficient to produce ultraviolet light reflecting multilayer films and cold mirror films.

The temperature gradient used in the example could also be combined with mechanical manipulation of the layers to produce a 5:1 layer thickness gradient. Such a 5:1 gradient could be used to produce solar concentrator films which reflected at wavelengths from 400 to 2000 nm.

EXAMPLE 2

A microlayer feedblock was designed to deliver a substantially linear layer thickness gradient of 2:1. That is, the thickest optical repeat unit thickness was about twice the thickness of the thinnest optical repeat unit thickness. The length of the feedports, from the first to the last feedport, varied in accordance with the equation:

$$L_n = \frac{GL_1}{1 + \frac{G-1}{1-M}(N-M)}$$

where G is the layer thickness gradient, $L_1$ is the length of the first feedport when N is 1, M is the total number of feedports in the feedblock, N is the feedport number, and $L_n$ is the length of the $n^{th}$ feedport. The cross-section of all of the feedports were identical.

The feedblock contained 655 feedports (M=655) with 327 feedports for polymethyl methacrylate (PMMA) interdigitated between 328 feedports for polycarbonate (PC). The first feedport was 1 inch in length ($L_1=1$) and the desired substantially linear layer thickness gradient was 2:1 (G=2). For this particular feedblock design, the equation, above, reduces to:

$$L_n = \frac{2}{1 - (0.00153)(N-655)}$$

The feedblock was designed for a total rate of 250 lbs/hr of polymer. Individual extruder rates were as reported in Table 2 below.

TABLE 2

| | Extrusion Rate (lbs/hr) | Polymer | % of Total |
|---|---|---|---|
| Skin 1 extruder | 25 | PC | 10 |
| Skin 2 extruder | 25 | PC | 10 |
| Total rate for 2 protective boundary layers | 12.5 | PC | 5 |
| Total rate for 328 PC layers | 112.5 | PC | 45 |
| Total rate for 327 PMMA layers | 75 | PMMA | 30 |

TABLE 2-continued

| | Extrusion Rate (lbs/hr) | Polymer | % of Total |
|---|---|---|---|
| Totals | 250 lbs/hr | | 100% |

The feedblock was designed to deliver the 655 layers of PC and PMMA and two protective boundary layers to a variable vane layer multiplier similar to the design disclosed in commonly-assigned Schrenk et al U.S. Pat. No. 5,094,788. The vanes were designed to split and stack the substreams, each containing 657 layers, in the approximate ratio of 0.292/0.143/0.286/0.280. Skin layers 1 and 2 were designed to be introduced prior to entering a 24 inch wide die capable of making sheet from about 0.030 to 0.125 inch thick.

To demonstrate the visible reflecting capabilities of such a sheet design, a computer simulation was run to predict the reflectance characteristics of two-component polymethyl methacrylate/polycarbonate multilayer sheet. The simulation used a software program entitled "Macleod Thin Film Optics" available from Kidger Optics, Sussex, England. The PC and PMMA were assumed to have refractive indices of 1.59 and 1.49, respectively, and identical specific gravities. A typical plot of reflectivity versus wavelength for the simulation showed an average reflectivity of over 80%. The simulation demonstrated a high and substantially uniform reflectance across the visible portion of the spectrum for the sheet. Further, the sheet may be thermoformed while retaining substantially uniform reflectance.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for generating a layer thickness gradient within a multilayer polymeric body comprising the steps of:
   providing separate streams of at least first and second heat plastified polymeric materials;
   dividing each of said streams into a plurality of first substreams and a plurality of second substreams;
   controlling the respective flow rates of said polymeric materials in said substreams to provide a differential in the volume of polymeric materials flowing through each of said substreams; and
   combining said substreams into a composite stream having said plurality of first and second substreams interdigitated into overlapping generally planar layers with substantially parallel layer interfaces to form said multilayer body, said layers formed from the substream having the greater volumetric flow rate being thicker than said layers formed from the substream having the lesser volumetric flow rate to form a gradient in layer thicknesses.

2. The method of claim 1 in which the flow rate of said polymeric materials is controlled by controlling the temperature of at least some of said plurality of first and second substreams to provide a temperature differential among at least some of said substreams, thereby controlling the flow of polymeric materials in said substreams.

3. The method of claim 2 in which said plurality of first and second substreams are grouped into at least two zones, and the temperature of each zone is separately controlled.

4. The method of claim 2 in which said temperature differential is at least 5° F.

5. The method of claim 2 including the steps of providing a third stream of heat plastified thermoplastic material to the exterior surfaces of said composite stream to form skin layers and forming the composite stream and skin layers into said multilayer polymeric body.

6. The method of claim 1 in which the flow rate of at least some of said polymeric materials in said plurality of first and second substreams is controlled by modifying the path lengths of said plurality of first and second substreams.

7. The method of claim 6 in which said path lengths are linearly varied.

8. The method of claim 6 in which said path lengths are varied in a step-wise fashion.

9. The method of claim 6 in which the flow rate in all of said plurality of first and second substreams is simultaneously controlled.

10. The method of claim 6 including the steps of providing a third stream of heat plastified thermoplastic material to the exterior surfaces of said composite stream to form skin layers and forming the composite stream and skin layers into said multilayer polymeric body.

11. The method of claim 1 in which the flow rate of at least some of said polymeric materials in said plurality of first and second substreams is controlled by modifying the path widths of said plurality of first and second substreams.

12. The method of claim 1 in which the flow rate of at least some of said polymeric materials in said plurality of first and second substreams is controlled by modifying the path heights of said plurality of first and second substreams.

13. A method for generating a layer thickness gradient within a multilayer polymeric body comprising the steps of:
   providing separate streams of at least first and second heat plastified polymeric materials;
   dividing each of said streams into a plurality of first substreams and a plurality of second substreams and then combining said plurality of first and second substreams into a first composite stream having said first and second substreams interdigitated into overlapping generally planar layers having substantially parallel layer interfaces;
   separating said composite stream along an axis parallel to said planar layers into a plurality of branch streams;
   manipulating at least one of said branch streams to increase the number of layers in said branch stream and thereby decrease their thicknesses; and
   recombining said branch streams into a second composite stream having overlapping generally planar layers having an increased number of substantially parallel layer interfaces to form said body, said layers having a gradient in thicknesses resulting from said manipulation of at least one of said branch streams.

14. The method of claim 13 including the steps of providing a third stream of heat plastified thermoplastic material to the exterior surfaces of said second composite stream to form skin layers and forming the second composite stream and skin layers into said multilayer polymeric body.

15. A method for generating a layer thickness gradient within a multilayer polymeric body comprising the steps of:
provide separate streams of at least first and second heat plastified polymeric materials;
dividing each of said streams into a plurality of first substreams and a plurality of second substreams and then combining said plurality of first and second substreams into a first composite stream having said first and second substreams interdigitated into overlapping generally planar layers having substantially parallel layer interfaces;
separating said composite stream along an axis perpendicular to said planar layers into a plurality of branch streams;
manipulating at least one of said branch streams to increase the number of layers in said branch stream and thereby decrease their thicknesses; and
recombining said branch streams into a second composite stream having overlapping generally planar layers having an increased number of substantially parallel layer interfaces to form said body, said layers having a gradient in thicknesses resulting from said manipulation of at least one of said branch streams.

16. The method of claim 15 including the steps of providing a third stream of heat plastified thermoplastic material to the exterior surfaces of said second composite stream to form skin layers and forming the second composite stream and skin layers into said multilayer polymeric body.

17. An apparatus for generating a layer thickness gradient within a multilayer polymeric body comprising:
means for providing at least first and second streams of heat plastified polymeric materials;
means for dividing said at least first and second streams into a plurality of first substreams and a plurality of second substreams;
means for controlling the respective flow rates of said polymeric materials in said plurality of first and second substreams to provide a differential in the volume of polymeric materials flowing through each of said substreams; and
means for combining said substreams into a composite stream having said plurality of first and second substreams interdigitated into overlapping generally planar layers with substantially parallel layer interfaces to form said multilayer body, said layers formed from the substream having the greater volumetric flow rate being thicker than said layers formed from the substream having the lesser volumetric flow rate to form a gradient in layer thicknesses.

18. The apparatus of claim 17 in which said means for controlling the flow rate of said polymeric materials comprise means for heating at least some of said plurality of first and second substreams to provide a temperature differential among at least some of said substreams.

19. The apparatus of claim 17 in which said means for controlling the flow rate of said polymeric materials comprise a feedblock containing flow passages for each of said plurality of first and second substreams, said flow passages having varying lengths as measured from the points at which said plurality of substreams enter said passages until said substreams are discharged from said passages.

20. The apparatus of claim 19 in which the lengths of said flow passages are varied linearly.

21. The apparatus of claim 19 in which the lengths of said flow passages are varied in a step-wise fashion.

22. The apparatus of claim 17 in which said means for controlling the flow rate of said polymeric materials comprise a feedblock containing flow passages for each of said plurality of first and second substreams, said flow passages having varying widths as measured from the points at which said plurality of substreams enter said passages until said substreams are discharged from said passages.

23. The apparatus of claim 17 in which said means for controlling the flow rate of said polymeric materials comprise a feedblock containing flow passages for each of said plurality of first and second substreams, said flow passages having varying heights as measured from the points at which said plurality of substreams enter said passages until said substreams are discharged from said passages.

24. An apparatus for generating a layer thickness gradient within a multilayer polymeric body comprising:
means for providing at least first and second streams of heat plastified polymeric materials;
means for dividing said at least first and second streams into a plurality of first substreams and a plurality of second substreams;
means for combining said substreams into a composite stream having said plurality of first and second substreams interdigitated into overlapping generally planar layers with substantially parallel layer interfaces to form said multilayer body;
means for separating said composite stream into a plurality of branch streams;
means for manipulating at least one of said branch streams to increase the number of layers in said branch stream and thereby decrease their thicknesses; and
means for recombining said branch streams into a second composite stream having overlapping generally planar layers having an increased number of substantially parallel layer interfaces to form said body, said layers having a gradient in thicknesses resulting from said manipulation of at least one of said branch streams.

25. The apparatus of claim 24 in which said means for separating said composite stream separate said composite stream along an axis perpendicular to said planar layers.

26. The apparatus of claim 25 in which said combining means comprise a feedblock containing flow passages for each of said plurality of first and second substreams, and said separating means comprise a plurality of vertically-oriented vanes.

27. The apparatus of claim 24 in which said means for separating said composite stream separate said composite stream along an axis parallel to said planar layers.

28. The apparatus of claim 27 in which said combining means comprise a feedblock containing flow passages for each of said plurality of first and second substreams, and said separating means comprise a plurality of horizontally-oriented vanes.

* * * * *